United States Patent [19]
Jenkins

[11] 3,931,015
[45] Jan. 6, 1976

[54] FILTER VESSEL AND FILTER ELEMENT ASSEMBLY

[75] Inventor: Bernard M. Jenkins, Chatham, N.J.

[73] Assignee: C. B. Kaupp & Sons, Inc., Maplewood, N.J.

[22] Filed: Dec. 4, 1974

[21] Appl. No.: 529,370

[52] U.S. Cl. ............... 210/232; 210/450; 210/451; 210/455; 210/474
[51] Int. Cl.² ......................................... B01D 29/10
[58] Field of Search .......... 210/114, 232, 391, 445, 210/473, 474, 484, 450, 451, 455; 55/334, 373, 376

[56] References Cited
UNITED STATES PATENTS

| | | | |
|---|---|---|---|
| 2,170,247 | 8/1939 | Lambert | 210/114 |
| 2,633,990 | 4/1953 | Simpson et al. | 210/445 X |
| 2,801,764 | 8/1957 | Russel et al. | 210/232 UX |
| 2,808,937 | 10/1957 | O'Meara | 210/445 |
| 3,295,689 | 1/1967 | Arranitakis | 210/391 X |
| 3,774,769 | 11/1973 | Smith | 210/232 |
| 3,814,261 | 6/1974 | Morgan, Jr. | 210/484 |

*Primary Examiner*—Theodore A. Granger
*Attorney, Agent, or Firm*—Harry B. Rook

[57] ABSTRACT

A casing preferably formed of sheet metal deep drawn and seamless has an outlet at its bottom and an inlet in its cylindrical side wall below its open top a portion of which is circumferentially indented providing an inwardly projecting shoulder below said inlet, and a cover is removably clamped on said open top of the casing and has an extension engaging and holding a circumferential projection on a filter element in liquid-tight contact with said shoulder. The extension has perforations providing for passing of liquid from said inlet into said filter element, and may have an imperforate portion to extend into the liquid in said casing below said circumferential shoulder when the cover is closed during filtering operations so the liquid level will drop below the upper end of the filter element when the cover is removed and thus prevent spilling of the liquid.

3 Claims, 3 Drawing Figures

FILTER VESSEL AND FILTER ELEMENT ASSEMBLY

BACKGROUND OF THE INVENTION

This invention relates to filters and particularly pressure filters of the type that include a vessel or casing in which is removably suspended a filter element, for example, a cylindrical perforated or woven wire side wall and a bottom wall, with or without a filter bag or a filter cartridge disposed therein, the vessel having a cover-closed upper end for insertion and removal of the filter element, and having a fluid inlet and an outlet at the upper and lower end portions, respectively.

Filters of this general type are exemplified by several patents among which are U.S. Pat. Nos. 3,640,392; 3,774,769 and 948,993. While these prior art filters serve well in filtering fluids especially liquids they are either complicated in construction, including many complex parts, or they are too expensive, or they are too difficult to assemble and disassemble especially when it is desired to clean or replace the filter elements.

SUMMARY OF THE INVENTION

The primary object of the present invention is to provide a filter of this general type which shall comprise a minimum number of parts that are simple and relatively inexpensive and which can be easily and quickly assembled and disassembled.

Another object is to provide a novel and improved construction and combination of a filter element, a vessel or casing therefor, preferably of sheet metal deep drawn and seamless, having an outlet connection and a cylindrical side wall having an open top and formed with an inlet and a portion of which is circumferentially indented providing an inwardly projecting circumferential shoulder below said inlet on which is seated a circumferential outward projection on the filter element, a cover removably clamped on said open top and having an extension formed with perforations to press and hold said outward projection on the filter element in liquid-tight contact with said shoulder providing for passage of liquid from said inlet into said filter element.

The invention also provides such a filter assembly wherein there is an outwardly extending flange on the upper open end of the casing in spaced opposed relation to an outwardly turned flange on the cover, and a clamp for connecting said flanges with a packing ring between them, and said cover includes a spacer extension on a top wall extending into the casing body and having a perforated flange connected thereto for holding said filter element in operative position with said flange below said inlet, whereby incoming fluid from said inlet can circulate around said spacer extension and through the perforations in said flange into said filter element.

Another feature of the invention is a liquid displacement extension on said cover to extend into the liquid in the casing when the cover is closed during filtering operations to displace a predetermined volume of liquid so the liquid level will drop below the upper end of the filter element when the cover is removed thereby to prevent spilling of the liquid.

Other objects, advantages and results will appear as the description proceeds.

A BRIEF DESCRIPTION OF THE DRAWINGS

For a complete understanding of the invention, reference should be had to the following description in conjunction with the accompanying drawings in which.

DESCRIPTION OF THE PREFERRED EMBODIMENT

Figure 1:
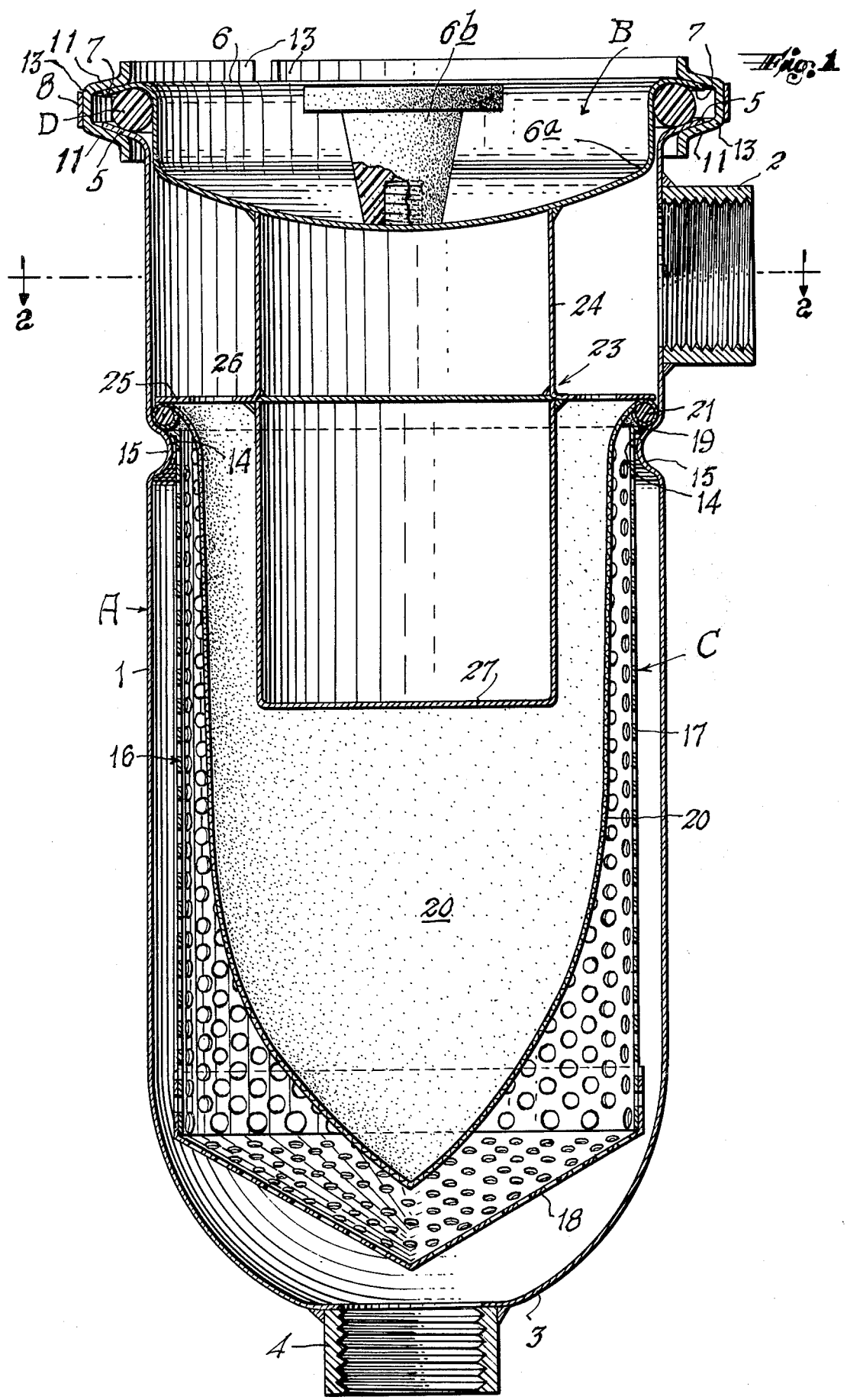
FIG. 1 is a central vertical sectional view through a filter embodying the invention.

Specifically describing the invention, the filter includes a casing A, a cover B therefor and a removable filter element C. The casing preferably is formed of sheet metal deep drawn and seamless with a cylindrical side wall 1 having a fluid inlet connection or coupling 2 intermediate its ends, and a bottom wall 3 having an outlet connection or coupling 4. The other or top end of the cylindrical wall is open and has an outwardly extending upwardly flared frusto-conical flange 5.

The cover has a top wall 6 to close the open top of said casing and provided with an outwardly and downwardly extending perimetral flange 7 which when the cover is closed is juxtaposed to the flange 5 with a packing ring preferably an elastic O-ring D between said flanges. The top wall has a dished portion 6a to fit loosely within the upper portion of the cylindrical wall when the cover is closed.

The cover is clamped in closed position in fluid-tight engagement with the flange 7 by a known type of ring clamp generally exemplified in Pat. No. 2,727,634. This clamp is shown as comprising a flexible band 8 having its ends connected together by T-headed bolt 9 whose head 9a is pivotally connected to one looped end of the band and whose threaded shank loosely passes through a bolt socket 10 that has at one end lateral studs 10a pivotally connected to the other looped end of the band. A nut 12 is screwed on the bolt shank in abutting relation to the outer end of said socket so that upon tightening of the nut the ends of the band are drawn toward each other. Secured on the inner side of the band are complemental arcuate segments 13 of a clamping ring each of which has inner integral diverging sides 11 each to engage the outer surface of one of the flanges 6 and 7 so that as the nut 12 is tightened the cover flange 7 is drawn toward the casing flange 6, the O-ring is compressed to form a fluid-tight connection between the flanges, and the dished portion 6a is moved inwardly of the casing.

Figure 2:
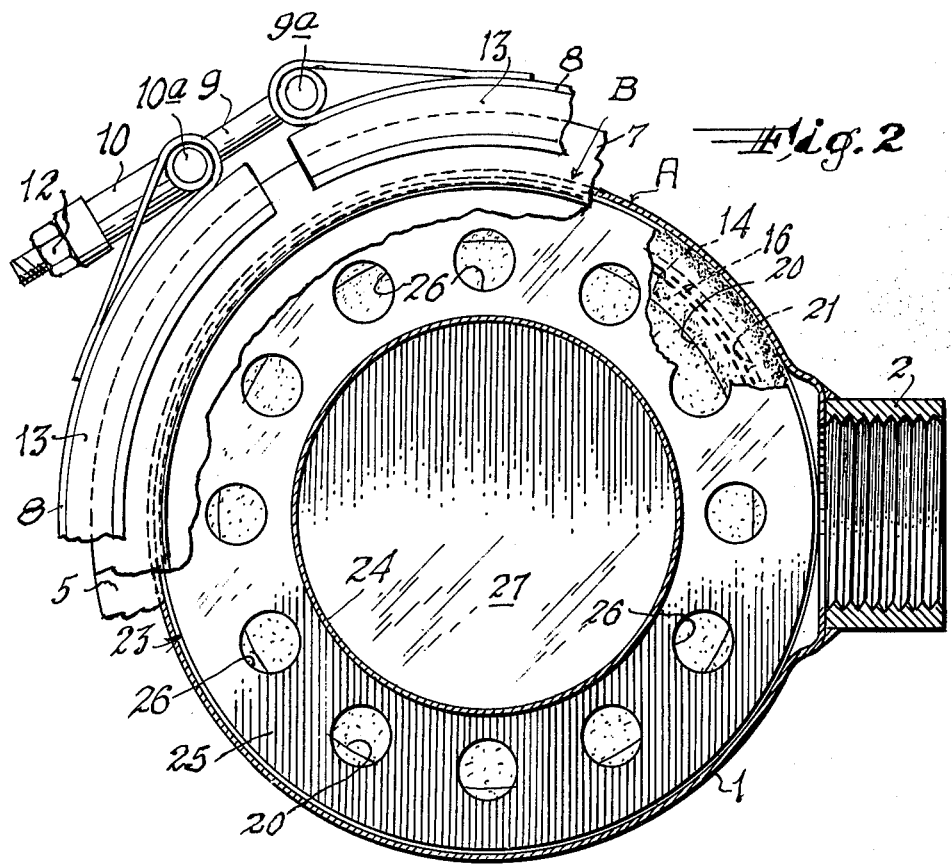
FIG. 2 is a view partially in top plan and partially in horizontal section on the plane of the line 2-2 of FIG. 1, with parts broken away.

The side wall 1 of the casing has an inwardly projecting circumferential shoulder 14 between the inlet 2 and the outlet 4, preferably formed by an exterior circumferential indentation 15. This shoulder serves as a seat for suspending the filter element C in the casing. One type of filter element, shown in FIGS. 1 and 2 comprises a basket 16 having a perforated cylindrical side wall 17 with an open top and a perforated bottom wall 18, and also having an outwardly extending circumferential projection to seat on said shoulder. Filter elements of different specific constructions may be utilized. Preferably, the basket is formed of deep drawn sheet metal with an outwardly extending circumferential flange 19 to seat on said shoulder 14, as shown in FIGS. 1 and 2; and disposed in the basket is a known type of felt or fabric filter bag 20 having an upper open end a packing ring such as an O-ring 21 secured in upper portion of the bag wall and which when in use seats on said shoulder 14 and on said flange 19 of the basket. The flange 19 and said O-ring 21 provide said outwardly extending circumferential projection of the filter element which is engaged by the cover and pressed on the shoulder 14 when the cover is closed. The cover has a knob 6b.

While the construction of the cover may be varied, preferably the top wall of the cover has a coaxial perforated extension 23 on its inner side, said extension being shown as comprising a coaxial cylindrical spacer 24 which is substantially smaller in diameter than the casing side wall and is secured to said top wall. The spacer 24 has an outwardly extending circumferential flange 25 to be disposed below said inlet 2 and to seat on said circumferential projection of the filter element when the cover is clamped in closed position. The flange 25 is perforated by holes 26 so that fluid entering the filter through said inlet may freely flow around the spacer and through said holes 26 into the filter element. Of course, the total area of the holes 26 should be greater than the area of the inlet opening.

The extension 23 preferably has a closed inner end 27 and has such a length as to project into the filter element a distance below the circumferential projection on the filter element when the cover is closed during filtering operations and displace a predetermined volume of the liquid in the casing so that when the cover is removed the level of the liquid will drop below the upper end of the filter element and thereby prevent spilling of the liquid.

Figure 3:
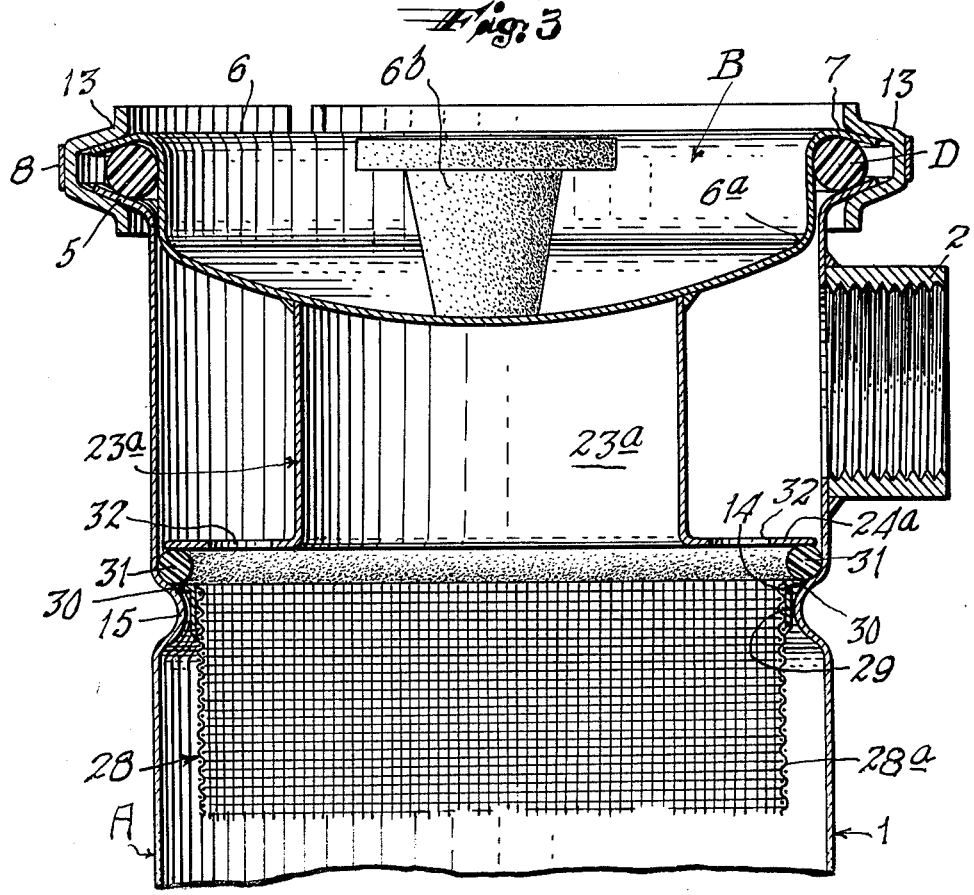
FIG. 3 is a fragmentary vertical sectional view showing a modification of the filter element.

A modification of the filter is shown in FIG. 3 and includes a filter element 28 having a perforated side wall 28a formed of fine foraminated, or reticulated material such as wire mesh or guage, a bottom wall, not shown, and a collar 29 secured to said side wall at the upper end thereof and provided with a circumferential outward projection in the form a flange 30 to seat on the inner shoulder 14 of the casing. Seated on said flange and said inner shoulder 14 of the casing is a packing ring, preferably an elastic O-ring 31. The extension 23a of the cover has a circumferential flange 24a at its inner end to engage and exert pressure on said O-ring to form a liquid-tight contact of the O-ring with said flange 30 and said shoulder 14 when the cover is closed, and the flange has perforations 32.

If desired a filter cartridge or other suitable filtering material could be included in the filter element 28.

From the foregoing it will be seen that the casing having the integral inner shoulder, the filter element having the circumferential outwardly extending projection removably seated on said shoulder, and the cover having the coaxial extension for pressing and holding said projection on said shoulder when the cover is clamped in closed position on the flange at the upper end of the casing, provide a simple and inexpensive combination the parts of which can be easily and quickly assembled and disassembled by an unskilled operator.

I claim:

1. A filter comprising a casing having a vertical cylindrical side wall, an open top, a side inlet extending through said side wall below said open top, and a bottom outlet, said cylindrical wall having a circumferentially indented portion providing an inner circumferential shoulder below said inlet and above said outlet, a filter element open at its top and having a circumferential outward projection separably seated on said shoulder below said inlet, a cover including a top wall and closing said top of said cylindrical side wall and having an extension to extend into said casing to a point below said inlet and engage said outward projection of the filter element and press said projection against said shoulder when the cover is closed, said extension having perforations located above said shoulder when the cover is closed and providing for flow of liquid from said inlet through the open top of said filter element, and means for releasably holding said cover in closed position.

2. The filter as defined in claim 1 wherein said extension has a cylindrical wall coaxial with said top wall of the cover and provided with an outwardly projecting circumferential flange to engage said outward projection of said filter element and press said projection against said shoulder when the cover is closed, and said perforations are formed in said circumferential flange.

3. The filter as defined in claim 2 wherein said extension has a portion below said circumferential flange to extend into the liquid in the casing below said inner circumferential shoulder when the cover is closed.

* * * * *